United States Patent
Purnell

[11] Patent Number: 5,147,557
[45] Date of Patent: * Sep. 15, 1992

[54] PAINT SPRAY BOOTH TREATMENT PROGRAM FOR WATER BASE AND WATER BASE AND WATER BASE BLENDED WITH OIL BASE PAINTS

[75] Inventor: Deborah L. Purnell, Philadelphia, Pa.

[73] Assignee: Betz Laboratories, Inc., Trevose, Pa.

[*] Notice: The portion of the term of this patent subsequent to Sep. 15, 2009 has been disclaimed.

[21] Appl. No.: 754,783

[22] Filed: Sep. 4, 1991

Related U.S. Application Data

[63] Continuation-in-part of Ser. No. 590,910, Oct. 1, 1990, abandoned, which is a continuation-in-part of Ser. No. 388,435, Aug. 2, 1989, abandoned, which is a continuation-in-part of Ser. No. 327,846, Mar. 23, 1989, abandoned, which is a continuation-in-part of Ser. No. 161,866, Feb. 29, 1988, Pat. No. 4,853,132.

[51] Int. Cl.$^5$ ................................................ C02F 1/56
[52] U.S. Cl. ........................................ 210/712; 55/85; 134/38; 210/728; 210/735; 210/736; 210/930; 252/181
[58] Field of Search ............. 55/85; 134/38; 210/702, 210/712, 723–728, 735, 736, 930; 252/180, 181; 427/331

[56] References Cited

U.S. PATENT DOCUMENTS

| | | | |
|---|---|---|---|
| 4,130,674 | 12/1978 | Roberts et al. | 427/331 |
| 4,637,824 | 1/1987 | Pominville | 210/728 |
| 4,853,132 | 8/1989 | Merrell et al. | 210/728 |
| 4,854,947 | 8/1989 | Patzelt | 55/85 |
| 4,888,386 | 12/1989 | Huang et al. | 525/57 |
| 4,940,491 | 7/1990 | Huang et al. | 134/38 |
| 5,015,391 | 5/1991 | Mohn | 210/736 |
| 5,024,768 | 6/1991 | Merrell | 210/728 |
| 5,060,682 | 10/1991 | Merrell | 210/736 |

*Primary Examiner*—Peter Hruskoci
*Attorney, Agent, or Firm*—Alexander D. Ricci; Gregory M. Hill

[57] ABSTRACT

A process for the detackification and coagulation of oversprayed water-borne and mixed water-borne and oil based paint particles in the water collection system of a paint spray booth comprising adding a unitary blend of an inorganic anion and a cationic polymer selected from the group consisting of polydiallyl dimethyl ammonium chloride, a condensation product of dimethylamine plus epichlorohydrin and a condensation product of dimethylamine plus ethylene diamine plus epichlorohydrin.

3 Claims, No Drawings

PAINT SPRAY BOOTH TREATMENT PROGRAM FOR WATER BASE AND WATER BASE AND WATER BASE BLENDED WITH OIL BASE PAINTS

This is a continuation-in-part of Ser. No. 07/590,910 filed Oct. 1, 1990, which is a continuation-in-part of Ser. No. 07/388,435, filed Aug. 2, 1989, which is a continuation-in-part of Ser. No. 07/327,846, filed Mar. 23, 1989 (abandoned), which is a continuation-in-part of Ser. No. 07/161,866, filed Feb. 29, 1988, now U.S. Pat. No. 4,853,132.

FIELD OF THE INVENTION

This invention relates to paint spray booth technology. Specifically, it deals with the treatment of water base and blended water base and oil base oversprayed paint captured in the recirculating water system of a paint spray booth.

BACKGROUND OF THE INVENTION

The spray painting of automobile bodies, truck engines, appliances, and other industrial goods is customarily carried out in enclosed areas called paint spray booths (PSB). These booths act to contain any fumes or oversprayed paint, to reduce the chances of air borne contamination and to protect the painters from these hazards. These booths vary in size, but are somewhat basic in their design and operation. A typical booth would thus consist of a work area, back section with water mist eliminators and a sump for collecting and holding the water for recirculation back to the mist eliminators.

The work pieces to be painted generally pass through the the work area while an air flow makes the oversprayed paint contact either the sump water or the spray from the water curtain. The air is scrubbed with recirculated water at the water curtain, passes through the mist eliminators and is removed by an exhaust fan. Roughly one-half of all paint sprayed ends up being captured by the water cycled through the mist eliminators.

Due to environmental pressure to reduce volatile organic compounds released into the atmosphere from the use of hydrocarbon solvent (oil) based paints, manufacturers are increasingly employing water-borne paints. The use of water-borne paints creates a problem in conventional PSB systems, since the over sprayed paint largely remains dispersed in the water held in the sump basin. Before this water can be recirculated to the mist eliminators for the removal of additional oversprayed paint, the dispersed paint previously collected must first be removed. Skimming or filtering the wastewater is ineffective since these paints exhibit no natural hydrophobicity or coagulation characteristics. Treatment programs for water-borne paints must therefore be different than treatment programs for hydrophobic oil based paints. The coagulation of dispersed paint particles is the primary objective in treating water borne paints. Tackiness is generally not a problem as it is with oversprayed oil based paints.

In some large industrial facilities, numerous paint spraying operations may be running simultaneously. Frequently, the water which has collected the oversprayed paint may feed into a single sump. At this location, the water is cleaned and then circulated back to the various spray booths from which it came. A unique problem arises in those industrial facilities in which water borne paints are sprayed in some booths, oil based paints in others and the water containing oversprayed paints from all booths is fed into a common sump. Effective treatment programs particles as well as detackify and coagulate the oil based paint particles. A treatment which may be effective for oil based paint particles may not have any effect on removing dissolved, hydrophilic water-borne paints. There is a need, therefore, to develop highly selective treatment programs to address these problems.

RELATED ART

The treatment of PSB water systems and sumps which contain the oversprays of both water-based and oil based paints is recognized as being difficult. U.S. Pat. No. 4,130,674, Roberts et al., discloses the use of a long chain surface active nitrogen derivative, such as dimethylditallowammonium chloride and polyvalent metal salts for the purpose.

U.S. Pat. No. 4,854,947, discloses a treatment for certain types of paints, including oil based and water-borne ones, utilizing an oil-in-water emulsion. Interestingly, the source of the hydrocarbon for the emulsion may be oily waste emulsions taken from various industrial operations.

Two related U.S. Pat. Nos. 4,888,386 and 4,940,491, disclose a similar treatment directed at both water-borne and oil based paints. Such paint spray booth systems may be treated with a combination of a melamine formaldehyde resin, a styrene-acrylate resin and polyvinyl alcohol. The method of treating the water system requires that the styrene-acrylate polymer be added separately from the polyvinyl alcohol, melamine-formaldehyde resin blend.

DETAILED DESCRIPTION OF THE INVENTION

The invention comprises a treatment program directed at paint spray booths in which water borne paints are employed. The invention is also efficacious in those paint spray booth water systems where a common sump is used to collect the over sprays of both water-borne and oil-based paints.

The treatment consists of adding a unitary aqueous blend of at least one cationic polymer and a inorganic anion to the PSB water system. The anion acts as an activator for the cationic polymer which causes the latter, upon contact with the dispersed water-borne paint particles, to coagulate and flocculate these particles. In those PSB systems where both water-borne and oil based paints are present, the polymer will also detackify the oil based paint particles before the floc is formed. The floc may either float or sink depending upon the charges in both the paint and the unitary blend of treatment chemicals.

It is believed that the anion activates the cationic polymer to coagulate on contact with the dissolved paint particles. The anion is then released from the forming floc, making it available for the activation of additional cationic polymer molecules. The anion is not consumed in the coagulation process. However, anions may be lost due to other circumstances. These include loss with water removed from the system in the wet sludge, through reaction and precipitation with water hardness cations such as calcium and magnesium and loss with system blowdown or drift out the exhaust. These losses can be predicted and partially controlled by adjusting the blend ratio of the anion to cationic polymer or by providing an additional charge of anion to the system at treatment start-up.

In the commercialization of this technology, when silicate is used as the anion an unexpected high rate of silicate loss is experienced. This is caused by pH suppression resulting from $CO_2$ adsorption during aeration of the wash water. The solubility of silicate is strongly dependent on the pH of the solution. It is believed that an effective silicate can be formed by adding silica in another form (such as colloidal silica) and then raising the pH with additions of caustic. At typical use concentrations the solution is buffered by the silica to a pH of about 10.3. As the pH of the solution decreases, the concentration of silicate drops due to a corresponding reduction in the solubility of silica.

The addition of the treatment chemicals separately to the wash water generates certain problems. Under the PSB systems treated by the various conventional programs, it is necessary to feed the separate components at specific ratios to achieve desired results. For example, some systems require the immediate flotation of the detackified paint. Other systems, however, require that the sludge remain dispersed until it reaches a sludge separation unit. The dispersion or separation properties of the sludge are affected by variations in the ratio of anion to cationic polymer. The single drum treatment program encompassed by the present invention alleviates the problem of one or the other component being improperly fed causing an upset in the blend ratio. It is thought that the primary benefit of this program is that a novel chemical specie is formed, the thermodynamics (i.e., Gibbs free energy of formation) of which favors the reaction with live paint. This novel compound also precludes unreacted or "free" silica and polymer from reacting with extraneous materials in the PSB system such as water hardness and other chemical impurities.

The cationic polymers of the present invention are of low to medium molecular weight, have a high charge density and may be cross-linked or linear condensation or addition polymers. Their number average molecular weight ranges between 1,000 and 600,000 and they are water soluble. The charge densities, as determined by the PVSK Colloid Titration Method (H. Terayama, Kayaku no Kenkya, Vol. 1, p. 75, 1948; H. Terayama, Kayaku no Kenkya, Vol. 4, p. 31, 1949; R. Senju, "Koroido Tekiteiho", Nankodo, Tokyo, 1969), are active in the range of about 1.5 to 12. meq/g active polymer.

Those polymers, which have demonstrated the desired performance characteristics, are:

| Polymer | Description |
| --- | --- |
| I | Polydiallyl dimethyl ammonium chloride (available from CPS Chemical as Age Flex) |
| II | Condensation product of dimethylamine plus epichlorohydrin plus ethylene diamine (available from American Cyanamid as Magnifloc 581 C) |
| III | Condensation product of dimethylamine plus epichlorohydrin (described in U.S. Pat. 3,738,945). |

Water soluble salts of the following inorganic anions, in particular the sodium, potassium and ammonium salts thereof, may be used in the practice of this invention.
Metasilicate—$SiO_3^{2-}$
Orthosilicate—$SiO_4^{4-}$
Disilicate—$Si_2O_5^{-2}$
Mixed Silicates—$Na_2O \cdot xSiO_2$ (where $x=3-5$)
Metaaluminate—$AlO_2^-$
Aluminosilicates—$Na_2O \cdot xAl_2O_3 \cdot ySiO_2$ (where $x+y=3-5$)
Molybdates—$MO_7O_{24}^{-6}$
Phosphomolybdate—$(PO_4)_2 \cdot 12MoO_3^{6-}$
Phosphates—$PO_4^{3-}$, $P_2O_7^{4-}$ In order to insure the stability of the two components of the invention, namely the cationic polymer and anion, it may be necessary to blend them in water. Incidentally, stability is defined herein as meaning that the blend of the cationic polymer and the anion do not precipitate or form a gel prior to addition to the PSB water system to be treated; they must remain in solution. The amount of water that may be required to make up the unitary blend of the invention may vary, but it will preferably be between 0 and 60% by weight.

The unitary blend consists of a cationic polymer and an anion in an aqueous solution. The cationic polymer is defined as comprising at least one of the cationic polymers shown above. The ratio of anion to cationic polymer will depend on characteristics such as the charge of the target paint, the amount of paint in the PSB water system and the predicted loss of the anion due to the factors described above. Generally, the ratio of anion:cationic polymer will be from about 0.25:10 to about 10:1, by weight. The preferred range, however, is from 0.25:1 to 5:1.

Once the appropriate ratio of additives is determined and the unitary blend is prepared, it is ready to be added to the PSB water system. Addition is most often made to the water at the location of the sump. However, other locations throughout the recirculating water system may prove to be more desirable, depending on the design of the PSB water system. When treating any water system, it is often necessary to charge the system with an initial dosage of treatment chemicals. An initial charge of the unitary blend of the present invention may fall in the range of about 100 to 5000 ppm, based on weight.

As previously mentioned, the system to be treated may contain features or exhibit factors which would account for anionic loss. Accordingly, it would be necessary to supply more anionic species to the water in such systems. Such an objective may be achieved by two methods. First, an initial charge of the unitary blend containing a higher amount of anion may be added, followed by a continuous feed of a blend having a lower amount of anion. This is not preferred, however, because such a treatment would require mixing and transporting to the addition site two different unitary blends. For example, an initial charge of 4:1 blend of anion:cationic polymer may be required, followed by a 2:1 continuous feed blend. It is preferred, however, that in such situations an initial charge of anion be delivered along with the initial charge of the unitary blend. The dosage range of the anion may be from 0-3000 ppm by weight. After the initial charges are added the treatment should be continuously fed to the PSB water system in order to maintain a constant predetermined concentration of cationic polymer and anion. The amount of the unitary blend required is dependent upon the amount of paint present in the system. Therefore, the unitary blend is continuously fed as a percent by weight, based on paint, conventionally known in the art as BOP. The continuous charge of the unitary blend is preferably in the range of 0.01–90% BOP by weight, per minute. The advantage of using the same ratio of anion to cationic polymer for the initial charge and through the continuous feed is that only one batch of the unitary blend need be prepared and transported to the treatment site.

EXAMPLES

The overall performance of the treatment program of the invention is analyzed for three characteristics: detackification, flocculation, and water clarity. A standard jar test is used to determine the efficacy of the unitary blend of treatment chemicals. The general procedure is to add 100 ml of tap water to a 120 ml jar. An amount of the unitary blend is then added as determined by the concentration desired. The jar is shaken. One ml of paint is added to the jar which is then vigorously shaken for 30 seconds. The rating criteria for detackification ml flocculation are as follows:

| Rating | Definition |
| --- | --- |
| Fail (1) | Paint forms large tacky globules and/or coating which adheres to the exposed surfaces of the jar and tongue depressor. |
| Poor (2) | Paint forms agglomerates which are slightly tacky or smeary to touch, or upon crushing. Paint sludge coats the tongue depressor. |
| Fair (3) | Paint forms granular flocs or globules which adhere to less than 10% of the exposed surface area of the jar or depressor. Sludge may be smeary, but not tacky. |
| Good (4) | Paint form particles or globules, some of which appear as specks on less than 1% of the exposed surface area of the jar or depressor. Sludge is neither smeary nor tacky. |
| Excellent (5) | Paint forms particles which do not adhere to the exposed surfaces of the jar or depressor. The paint sludge may float, sink, or be dispersed in the water. |

Water clarity is evaluated visually according to the following criteria.

| | |
| --- | --- |
| Excellent: | clear water |
| Good: | slightly cloudy water |
| Fair: | cloudy water |
| Poor: | turbid water |

The following table shows the results of jar tests conducted on different water-borne paints. The unitary treatment blend was the same. It shows that some level of threshold efficacy is achieved at around this concentration range of 800–1000 ppm for all but the first two paint samples. It is surmised that the greater the concentration, the more effective the treatment. But, as the results show, not all paints respond the same way at the same concentrations. It is thus necessary to use this procedure to evaluate a proper treatment dosage prior to initiating treatment on a full scale PSB water system.

TABLE I

Overall Efficacy
Unitary Treatment Blend: (by weight) 50% water,
25% sodium disilicate, 25% (50:50 polymers II:III)

| Paint | Treatment Dosage | Rating | Water Clarity |
| --- | --- | --- | --- |
| Inmont E54WD005 | 800 ppm | 5 | poor |
| | 1000 ppm | 5 | poor |
| Inmont E5AWD016 | 800 ppm | 5 | poor |
| | 1000 ppm | 5 | poor |
| Inmont E55AD022 | 800 ppm | 5 | fair |
| | 1000 ppm | 5 | good |
| CIL 1841-1958 | 800 ppm | 5 | fair |
| | 1000 ppm | 5 | excellent |
| CIL 1831-1960 | 800 ppm | 5 | fair |

TABLE I-continued

Overall Efficacy
Unitary Treatment Blend: (by weight) 50% water,
25% sodium disilicate, 25% (50:50 polymers II:III)

| Paint | Treatment Dosage | Rating | Water Clarity |
| --- | --- | --- | --- |
| | 1000 ppm | 5 | fair |
| CIL 1841-1952 | 800 ppm | 5 | fair |
| | 1000 ppm | 5 | excellent |
| PPG I | 800 ppm | 5 | fair |
| | 1000 ppm | 5 | fair |
| PPG II | 800 ppm | 5 | fair |
| | 1000 ppm | 5 | excellent |
| Dupont 407-AE788 | 800 ppm | 5 | poor |
| | 1000 ppm | 5 | good |
| Dupont 408-DF165 | 800 ppm | 5 | poor |
| | 1000 ppm | 5 | fair |

In order to test the efficacy of the present invention under simulated conditions, a Bink Center well pilot wet paint spray booth was set up. This device allows for the analysis of treatment programs on a laboratory scale but under the same dynamic factors present in full scale industrial paint spray booth systems. The total water volume in the pilot booth systems is 90 gallons and the flow rate at the water curtain is about 20 gallons per minute. The paint spray and the treatment dosage rates may be varied as desired.

Two test runs were conducted, each with a different paint but the same treatment chemicals. The parameters of the first test may be summarized as follows:

| | |
| --- | --- |
| Paint: | 7/1 blend respectively, by weight, of a Dupont silver base coat (water-borne) and a PPG rigid clear coat (oil based) |
| Paint Spray Rate: | 15 gm/minute (44.0 ppm/min) |
| Treatment Composition: | Unitary blend, by weight percent of: 50% water 28.85% cationic polymer (consisting of 75% Polymer III, 25% Polymer I) 21.15% sodium disilicate |
| Initial Charge: | 1600 ppm, by weight, of unitary blend |
| Initial Anion Addition: | 1000 ppm, by weight sodium disilicate |
| | The unitary treatment blend was then fed continuously at a rate of 40% BOP per minute. |
| Results: | detackification and flotation rating — excellent water clarity — good/excellent |

Once the detackified floc formed, a standard dewatering and foam control agent was added, as is customary, to further concentrate the floc for easier disposal and to control the profileration of foam.

The second run may be summarized as follows:

| | |
| --- | --- |
| Paint: | 7/1 blend, respectively, by weight, of a PPG Burgundy base coat (water-base) and a PPG Clear coat (oil-based) |
| Paint Spray Rate: | 15 gm/minute (35.9 ppm/minute) |
| Treatment composition: | Unitary blend, by weight percent, of: 50% water 28.85% cationic polymer (consisting of 75% polymer III, 25% polymer I) 21.15% sodium disilicate |
| Initial charge: | 1600 ppm, by weight, of unitary blend |
| Initial Anion Addition: | 1000 ppm, by weight, sodium disilicate |

The unitary blend was then fed continuously at a rate of 86% BOP per minute.
Results:
    detackification and flotation rating—excellent water clarity—excellent As with the first run, once the detackified floc formed, a standard dewatering and foam control agent was added.

Having thus described my invention, I claim:

1. In a paint spray booth containing water for collection of oversprayed water-borne or mixed water-borne and oil base paint, a process for detackifying and coagulating the oversprayed water-borne or mixed water-borne and oil base paint consisting essentially of adding to the water from 0.01 to 90%, based on paint, of a unitary blend comprising at least one cationic polymer selected from the group consisting of polydiallyl dimethyl ammonium chloride, a condensation product of dimethylamine plus epichlorohydrin plus ethylene diamine and a condensation product of dimethylamine plus epichlorohydrin, an inorganic anion selected from the group consisting of metasilicate, orthosilicate, disilicate, mixed silicate, metalluminate, aluminosilicate, molybdate, phosphomolybdate and phosphate or the sodium, potassium or ammonium salts thereof wherein the weight ratio of inorganic anion to cationic polymer is between 0.25 to 10 and 10 to 1, and from about 50% to 60%, by weight, of water.

2. The process of claim 1 wherein the ratio, by weight, in the unitary blend of anion:cationic polymer is from about 0.25:1 to about 5:1.

3. The process of claim 1 further comprising an initial charge of from about 200 to 5000 ppm, by weight, of the unitary blend added to the water in the paint spray booth.

* * * * *